United States Patent [19]

Vecchiotti

[11] 4,197,364
[45] Apr. 8, 1980

[54] BATTERY SEPARATOR AND METHOD OF MANUFACTURING SAME

[75] Inventor: Camillo M. Vecchiotti, Ridgewood, N.J.

[73] Assignee: Amerace Corporation, New York, N.Y.

[21] Appl. No.: 875,695

[22] Filed: Feb. 6, 1978

Related U.S. Application Data

[62] Division of Ser. No. 726,264, Sep. 24, 1976, Pat. No. 4,086,119.

[51] Int. Cl.² ............................................ H01M 2/18
[52] U.S. Cl. .................................... 429/139; 428/77; 428/81; 428/119; 428/304; 429/254
[58] Field of Search ................ 429/129, 130, 136–141, 429/249, 251–254; 428/34, 35, 81, 192, 304, 306, 177, 77, 119

[56] References Cited

U.S. PATENT DOCUMENTS

| 2,047,179 | 7/1936 | Martis et al. | 429/139 |
|---|---|---|---|
| 3,647,554 | 3/1972 | Arrance et al. | 429/139 |
| 3,674,109 | 7/1972 | Murase | 428/310 |
| 3,696,061 | 10/1972 | Selsor et al. | 429/253 |
| 3,780,731 | 12/1973 | Quello | 428/310 |
| 3,875,270 | 4/1975 | Haefner et al. | 428/304 |
| 3,936,553 | 2/1976 | Rowe | 428/119 |
| 3,967,978 | 7/1976 | Honda et al. | 429/254 |
| 4,002,417 | 1/1977 | Vecchiotti et al. | 264/296 |
| 4,037,030 | 7/1977 | Sabatino | 429/139 |
| 4,092,386 | 5/1978 | Rigstad | 429/139 |

FOREIGN PATENT DOCUMENTS 362120  12/1931  United Kingdom .................... 429/139

Primary Examiner—William J. Van Balen
Attorney, Agent, or Firm—S. Michael Bender; Ken Richardson

[57] ABSTRACT

A battery separator in which plural sheets of microporous plastic material are connected by a strip or strips of polyvinylchloride in a manner suitable to form a sleeve. The strips may be high frequency heat sealed to the sheets or may be bonded thereto by solvating the outer edge portions of the strips, applying pressure between the strips and the sheets, and allowing the solvent to evaporate. A method of manufacturing a battery separator of the above type.

7 Claims, 4 Drawing Figures

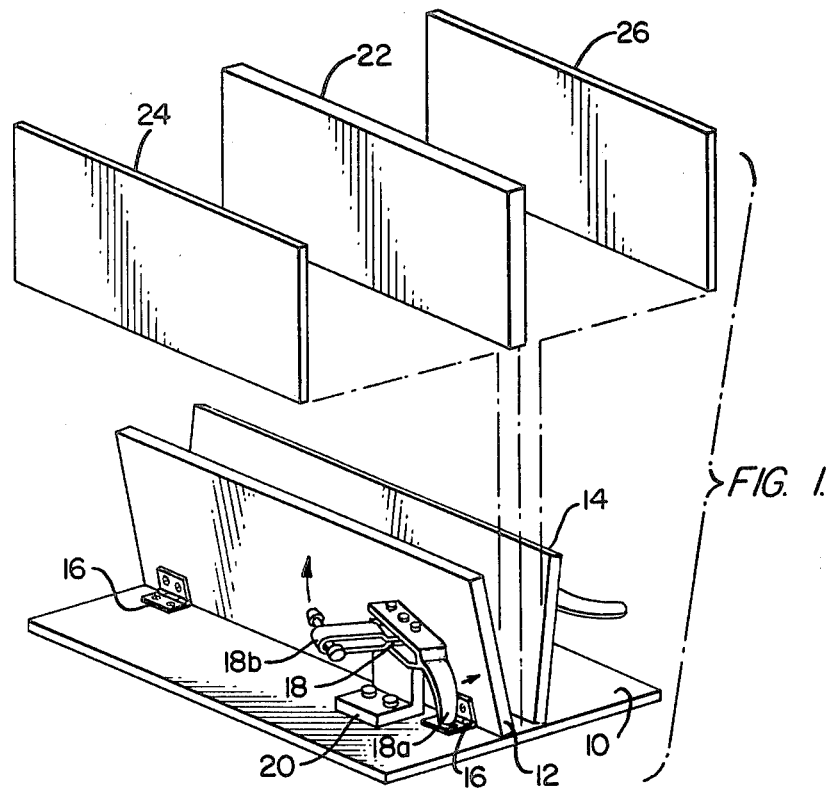
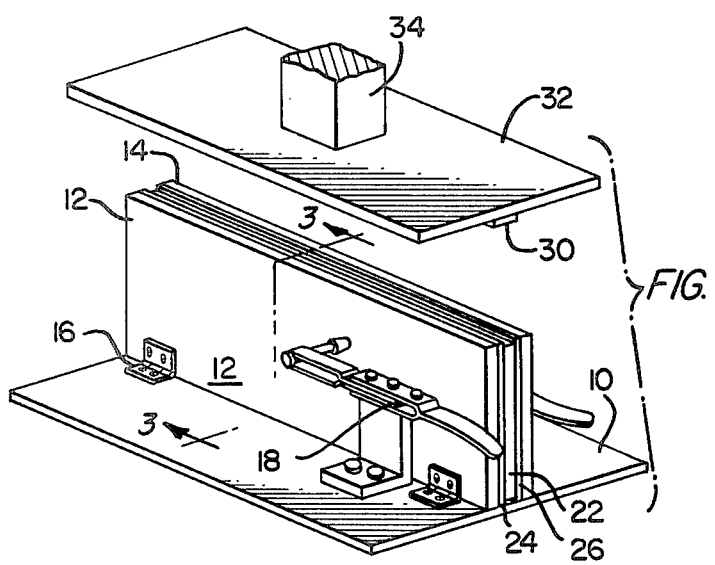
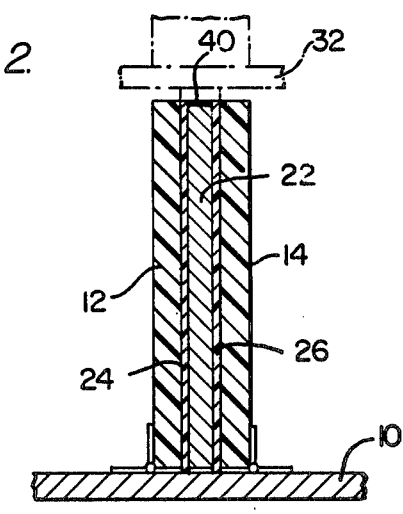
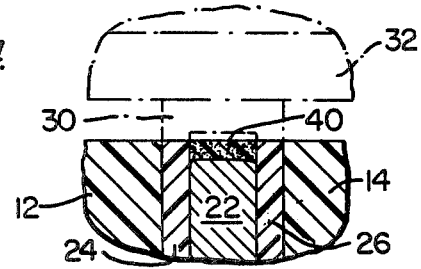

BATTERY SEPARATOR AND METHOD OF MANUFACTURING SAME

This is a division of application Ser. No. 726,264, filed Sept. 24, 1976, now U.S. Pat. No. 4,086,119.

BACKGROUND OF THE INVENTION

This invention relates to a battery separator and to a method of manufacturing same in which the separator is formed of a plurality of sheets of microporous plastic material adhered together by a strip or a plurality of strips of polyvinylchloride material in a manner suitable to form a sleeve.

Traditionally, wet cell batteries employ at least one pair of opposite polarity planar electrodes, normally referred to as plates, which are closed spaced in a parallel relationship and immersed in a liquid electrolyte to form an electrochemical couple. A great majority of these type batteries employ a plurality of pairs of the opposite polarity plates being normally arranged in an upstanding face-to-face relation, and with the exact number of pairs in a particular battery depending upon the capacity and/or voltage desired.

To avoid adjacent opposite polarity plates from coming into direct physical contact and thereby causing arcing and/or short circuiting, it is necessary to electrically insulate the adjacent plates from each other. To achieve this insulation, electrically insulative material, usually in the form of sheets similar in size to electrode plates, and commonly referred to as separators, have been positioned between the opposite polarity plates, with the insulative material being permeable or semipermeable to the liquid electrolyte to sustain the ionic conduction required for the battery action.

In older designs the separators were formed of rubber, wood, and glass while more recent designs have used microporous plastic materials, including polyethylene, vinyl resin, and the like, which have excellent insulating capabilities yet are relatively low in weight and cost. An example of such a plastic separator is disclosed in U.S. Pat. No. 3,696,061, issued Oct. 3, 1972, in the name of Selsor et al and assigned to the same assignee as the present application. The disclosure of this U.S. Pat. No. 3,696,061 is hereby incorporated herein by this reference In applications where heavy-duty use and requirements are such that maximum insulating conditions between the positive and negative plates must be provided, such as in the case of industrial batteries, it has been found advantageous to place a sleeve of insulating material upon either the positive or negative plates with the sleeve being formed and folded to dimensions dictated by the plate size. In a typical sleeve configuration, one side is formed by the end portions of the sheet which are overlapped and sealed, so that the sleeve has completely insulating sides to prevent lead dendrites from forming from the negative to the positive plates when the battery is charging and discharging in service.

Although battery separators of a plastic material of the general type disclosed above, and as specifically disclosed in the aforementioned Selsor et al patent have enjoyed widespread commercial success, especially for use in industrial type batteries, such separators are relatively brittle and therefore special means are required to fold the material into the desired sleeve configuration without fracturing or breaking the material. For example, in commonly assigned U.S. Pat. No. 4,002,417, filed Dec. 23, 1974, there is disclosed a relatively complex and relatively expensive machine for folding such separator material to form sleeves or envelopes without causing fracture or breakage of the material.

SUMMARY OF THE INVENTION

It is, therefore, an object of the present invention to provide a battery separator which is formed into a sleeve-like configuration without the need for folding the separator material.

It is a still further object of the present invention to provide a battery separator of the above type which is formed by plural sheets of microporous plastic material having strips of polyvinylchloride material adhered thereto in a manner suitable to form a sleeve.

It is a still further object of the present invention to provide a method for manufacturing a battery separator of the above type.

Toward the fulfillment of these and other objects, the separator of the present invention comprises a plurality of sheets of microporous plastic material disposed in a spaced parallel relation and a strip or a plurality of strips of polyvinylchloride extending between the sheets. The strips are adhered to each of the sheets to form a sleeve.

BRIEF DESCRIPTION OF THE DRAWINGS

FIG. 1 is a perspective exploded view of the apparatus and materials utilized in forming the separator sleeve of the present invention;

FIG. 2 is a view similar to FIG. 1 but showing the materials of FIG. 1 clamped in the apparatus of FIG. 1 and extending below an upper electrode of a high frequency generator used in the apparatus;

FIG. 3 is a cross-sectional view taken along the line 3—3 of FIG. 2 with the upper electrode of FIG. 2 being shown in its operative position; and FIG. 4 is an enlarged partial portion of FIG. 3.

DESCRIPTION OF THE PREFERRED EMBODIMENT

Referring specifically to FIG. 1 of the drawings, the reference numeral 10 refers in general to a support plate which may be in the form of a bed plate or which may form the upper surface of a work table. A pair of clamping plates 12 and 14 are disposed on the support plate 10 and a pair of hinges 16 pivotally mount the clamping plate 12 to the support plate 10, it being understood that an identical pair of hinges (not shown) pivotally mount the plate 14 to the plate 10. The plates 12 and 14 are shown in their open or inoperative position in FIG. 1.

A toggle clamp 18 is mounted on a support bracket 20 which in turn is affixed to the upper surface of the support plate 10. The toggle clamp 18 includes a handle portion 18a and a clamping portion 18b which engages the corresponding clamping plate 12 upon manual movement of the handle portion 18a inwardly in the direction shown by the directional arrows, to exert a mechanical force against the plate 12. Although not shown in FIG. 1, it is understood that a toggle clamp and support bracket are also disposed on the other side of the plate 14 and function in an identical manner to the clamp 18 and the support bracket 20.

A plate electrode 22 which is also adapted to function as a platen, along with a pair of sheets 24 and 26 of microporous plastic material which form a portion of the sleeve to be formed, are adapted to be inserted between the clamping plates 12 and 14. The electrode 22 and the sheets 24 and 26 are shown in an assembled or clamped condition relative to the clamping plates 12 and 14 in FIG. 2, with the sheets 24 and 26 extending between the electrode 22 and the two clamping plates 12 and 14, respectively. It is noted that in the position of FIG. 2 the toggle clamps 18 have been actuated to exert a clamping force against the plates 12 and 14 which urge the latter into intimate contact with the sheets 24 and 26, respectively, which in turn are pressed against the electrode 22.

Also shown in FIG. 2 is a bar electrode, or platen, 30 which is supported on the lower surface of a movable support plate 32 connected to a conventional high frequency generator (not shown) and which extends over the assembly formed by the clamping plates 12 and 14, the electrode 22 and the plastic sheets 24 and 26. The bar electrode 30 is adapted to conduct current through the electrode 22 as will be described in detail later.

An air cylinder or piston having a movable portion 34 is adapted to move the plate 32, and therefore the bar electrode 30, in a generally up-and-down direction relative to the support plate 10. Since this type of air cylinder or piston is well known in the art, only a portion of the movable portion 34 thereof is shown, and it will not be described in any further detail. The bar electrode 30, along with the support plate 10 and the electrode 22 are of an electrically conductive material, such as aluminum or brass, for reasons that will be described in more detail later.

In accordance with the method of the present invention, the electrode 22 and the sheets 24 and 26 are placed between the clamping plates 12 and 14 in the position shown and the toggle clamps 18 are actuated to move the clamping plates to their clamping position of FIG. 2. It is noted from a close inspection of FIG. 2 that, in the clamped position, the upwardly facing surface of the electrode 22 is slightly recessed below the upwardly facing surfaces of the sheets 24 and 26 and the plates 12 and 14 for reasons that will be described in more detail later.

With the bar electrode 30 being maintained in a spaced relationship relative to the plates 12 and 14 as shown in FIG. 2, a strip 40 of polyvinylchloride thermoplastic material is then placed over and upon the recessed upwardly facing surface of the electrode 22 and between the opposed upper portions of the inwardly facing side walls of the sheets 24 and 26. As better shown in FIGS. 3 and 4, the strip 40 has a width substantially corresponding to the width of the electrode 22 and to the interior transverse extent of the sleeve ultimately desired, and the thickness of the strip is selected so that its upper surface extends slightly above the respective upper edge portions of the sheets 24 and 26 when supported by the upwardly facing surface of the electrode 22 as indicated by the broken line in FIG. 4.

After the strip 40 has been inserted in the position shown, the air cylinder is actuated to move the piston portion 34, and therefore the support plate 32 and the bar electrode 30, to a position shown in FIGS. 3 and 4 where the bar electrode extends across the upper edges of the sheets 24 and 26 and the strip 40 in engagement therewith. it will be noted that the pressure applied upon the strip 40 by the electrode 30 causes the strip to be compressed and renders the upwardly facing surface of the strip 40 flush with respect to the upwardly facing surfaces of sheets 24 and 26 as seen to best advantage in FIG. 4.

A predetermined amount of high frequency electrical power from the high frequency generator is then applied to a circuit including the electrode 22, the bar electrode 30 and the support plate 10 for a predetermined time. The proportional amount of heat energy thus generated is transferred from the electrodes 22 and 30 to the strip 40 and the upper portions of the sheets 24 and 26. This heat energy is applied for a time sufficient to at least soften the outer surface portions of the strip 40 at the interface with the sheets 24 and 26 after which the current flow through the above circuit is terminated and the softened portions of the strip allowed to cool which fuses, or heat seals, the strip to the opposed upper inner surfaces of the sheets 24 and 26.

After a relatively brief interval of time sufficient to permit cooling and solidification of the strip 40, the air cylinder is then actuated to move the portion 34, the plate 32 and, therefore, the bar electrode 30 to its upper, inoperative position shown in FIG. 2, and the clamps 18 are released to permit the clamping plates 12 and 14 to swing to their inoperative positions of FIG. 2. The assembly formed by the sheets 24 and 26 and the electrode 22 can then be removed and rotated 180° about its longitudinal axis, positioned on electrode 22, and the above process repeated to apply another or second strip 40 to the opposite pair of opposed upper inner surfaces of the sheets 24 and 26 to form a complete sleeve. As indicated above with reference to FIG. 4, the upwardly facing surface of the strip 40 will be flush with respect to the upwardly facing surfaces of sheets 24 and 26 when each sleeve forming operation has been completed.

Although the type of materials used in the foregoing operation can vary, according to a preferred embodiment the sheets 24 and 26 of microporous material preferably are formed of a free-flowing powder blend of vinyl resins and silica with a volatile organic solvent and a nonsolvent being added to the blend, as disclosed in the above-mentioned U.S. Pat. No. 3,696,061. The strips 40 may be of a polyvinylchloride composition containing polyvinylchloride powder, a plasticizer, and a stabilizer. Also, a blowing or foaming agent such as azodicarbonamide may be added to the composition forming the strip 40 to cause the latter to expand in the above-described process and facilitate the bonding of the strip 40 to the sheets 24 and 26.

In each of the foregoing methods it is understood that the time of application of the high frequency electrical current and of application of pressure to the strip 40 and the corresponding portions of the sheets 24 and 26 can vary in accordance with the type of materials used and the particular dimensions of the materials.

According to an alternative embodiment, the use of the heat sealing technique is eliminated and the side edges of the strip 40 are wiped with a solvent such as tetrahydrofuran before the strip is applied between the sheets 24 and 26. The solvent operates in a conventional manner to solvate, or substantially dissolve the outer surface portions of the edges of the strip 40. The strip 40 is then applied over and upon the upwardly facing surface of the electrode 22 and between the sheets 24 and 26 and the toggle clamps 18 are actuated, as in the previous embodiment, to apply pressure between the sheets 24 and 26 and the strip 40. The assembly is maintained in this position while the solvent evaporates either by the application of heat from an external source or by the ambient air, which causes the previously solvated edge portions of the strip to dry to bond the strip to the sheets 24 and 26. It is noted that, in this embodiment, the electrodes 22 and 30 would merely function as platens with the need for applying an electrical heating current being eliminated.

In order to complete the sleeve, the sheets would be turned over and another strip 40 bonded between the opposite second pair of opposed upper inner surfaces thereof as in the previous embodiment.

It is understood that variations in the separator and the method of manufacturing same as disclosed above can be made by those skilled in the art without departing from the invention as defined in the appended claims.

I claim:

1. A battery separator comprising:
   (a) a pair of sheets of microporous plastic material disposed in a spaced parallel relationship; and
   (b) at least one first member of a thermoplastic material formed from a compressible solid strip having a top surface, a bottom surface, a pair of opposed side surfaces and a first size suitable for allowing said first member to fit between inner facing confronting surfaces of said pair of sheets, said first member being in a compressed condition whereupon said first member assumes a second size such that said top surface of said first member lies flush with upwardly facing surfaces of said pair of sheets and outer regions of said opposed side surfaces are urged against said confronting inner facing first surfaces of said pair of sheets, each outer region of each one of said opposed side surfaces of said first member being adhered to a corresponding one of said two confronting inner facing surfaces of said pair of sheets.

2. The separator of claim 1, further comprising a second member of a thermoplastic material formed from a compressible solid strip having a top surface, a bottom surface, a pair of opposed side surfaces, and a first size suitable for allowing said second member to fit between said inner facing confronting surfaces of said pair of sheets, said second member being in said compressed condition wherein said second member assumes a second size such that said top surface of said second member lies flush with upwardly facing surfaces of said pair of sheets and outer regions of said opposed side surfaces are urged against said confronting inner facing surfaces of said pair of sheets, each outer region of each one of said opposed side surfaces of said second member being adhered to a corresponding one of said two confronting inner facing surfaces of said pair of sheets.

3. The separator of claim 1, wherein said first member extends longitudinally with respect to said pair of sheets so as to form a sleeve having an interior transverse extent equal to a transverse extent of said first member.

4. The separator of claim 2, wherein said second member extends longitudinally with respect to said pair of sheets so as to said form said sleeve having said interior transverse extent equal to said transverse extent of said second member.

5. The separator of claim 4, wherein first and second side edge portions of one of said pair of sheets extend coplanar with a corresponding first and second side edge portions of the other one of said pair of sheets.

6. The separator of claim 5, wherein said first member and said second member is heat sealed to said pair of sheets.

7. The separator of claim 5, wherein said first member is said adhered between said sheets by solvating said each outer region of each one of said opposed side surfaces of said first member, and wherein said second member is said adhered between said sheets by solvating said each outer region of each one of said opposed side surfaces of said second member.

* * * * *